United States Patent
Sudmann et al.

(10) Patent No.: US 10,335,795 B2
(45) Date of Patent: Jul. 2, 2019

(54) GYRATORY CRUSHER FOR COMMINUTING MATERIAL TO BE CRUSHED

(71) Applicant: THYSSENKRUPP INDUSTRIAL SOLUTIONS AG, Essen (DE)

(72) Inventors: David Sudmann, Münster (DE); Hans-Jürgen Mecke, Duisburg (DE)

(73) Assignee: THYSSENKRUPP INDUSTRIAL SOLUTIONS AG, Essen (DE)

( * ) Notice: Subject to any disclaimer, the term of this patent is extended or adjusted under 35 U.S.C. 154(b) by 1009 days.

(21) Appl. No.: 14/438,587

(22) PCT Filed: Oct. 22, 2013

(86) PCT No.: PCT/EP2013/072084
§ 371 (c)(1),
(2) Date: Apr. 24, 2015

(87) PCT Pub. No.: WO2014/064112
PCT Pub. Date: May 1, 2014

(65) Prior Publication Data
US 2015/0273475 A1    Oct. 1, 2015

(30) Foreign Application Priority Data
Oct. 26, 2012 (DE) .................. 10 2012 110 267

(51) Int. Cl.
*B02C 2/06* (2006.01)
*B02C 2/04* (2006.01)
(Continued)

(52) U.S. Cl.
CPC ............ *B02C 2/06* (2013.01); *B02C 2/042* (2013.01); *B02C 23/04* (2013.01); *F16B 1/005* (2013.01);
(Continued)

(58) Field of Classification Search
CPC .......... B02C 2/06; B02C 23/04; B02C 2/042; Y10T 279/1283; Y10T 279/1274;
(Continued)

(56) References Cited

U.S. PATENT DOCUMENTS 1,329,835 A * 2/1920 Hewes ................ B02C 2/10
                                                    241/209
1,607,615 A * 11/1926 Greenfield ........... B02C 2/06
                                                    241/156
(Continued)

FOREIGN PATENT DOCUMENTS

BE      380542 A    7/1931
CN      1048991 A   2/1991
(Continued)

OTHER PUBLICATIONS

English Translation of Abstract of FR 2698131 A1.
(Continued)

*Primary Examiner* — Sean M Michalski
(74) *Attorney, Agent, or Firm* — thyssenkrupp North America, Inc.

(57) ABSTRACT

The invention relates to a gyratory crusher for comminuting material to be crushed, comprising a crusher housing, in which a crusher shaft is arranged, said shaft being held in the crusher housing so that it can tumble about a vertical axis. To accommodate the crusher shaft, the crusher is provided with a cross member which extends diametrically across the crusher housing and the cross member ends of which are connected to the crusher housing. According to the invention, the connection of the cross member ends to the crusher housing has at least one hydraulic tensioning device.

12 Claims, 2 Drawing Sheets

(51) Int. Cl.
*F16B 1/00* (2006.01)
*B02C 23/04* (2006.01)
*F16B 31/04* (2006.01)

(52) U.S. Cl.
CPC ....... *F16B 31/043* (2013.01); *Y10T 29/49826* (2015.01); *Y10T 29/49963* (2015.01)

(58) Field of Classification Search
CPC ............ Y10T 279/12; B23B 31/16287; B23B 31/302; B23B 31/30
USPC ................................................ 241/205, 209
See application file for complete search history.

(56) References Cited

U.S. PATENT DOCUMENTS

| | | | | |
|---|---|---|---|---|
| 2,190,036 A * | 2/1940 | Morch | ...................... | B02C 2/06 241/156 |
| 2,291,992 A * | 8/1942 | Stearns | ...................... | B02C 2/06 241/156 |
| 2,832,547 A * | 4/1958 | Kennedy | .................... | B02C 2/06 241/209 |
| 2,878,082 A * | 3/1959 | Becker | ...................... | B02C 2/06 241/209 |
| 3,420,148 A * | 1/1969 | Doerfer | .................... | B23Q 3/08 269/26 |
| 3,771,735 A * | 11/1973 | Decker | ................... | B02C 2/047 241/216 |
| 3,774,857 A * | 11/1973 | Decker | .................... | B02C 2/06 241/209 |
| 3,924,815 A * | 12/1975 | Haggren | ................. | B02C 2/005 241/209 |
| 4,272,030 A * | 6/1981 | Afanasiev | ............... | B02C 2/042 241/210 |
| 4,391,414 A * | 7/1983 | Reiter | ...................... | B02C 2/06 241/213 |
| 4,772,336 A * | 9/1988 | Enomoto | ................. | C21D 9/50 148/520 |
| 5,152,468 A | 10/1992 | Virtamo et al. | | |
| 5,584,636 A * | 12/1996 | Ramsey | ............... | A01D 87/122 414/24.5 |
| 5,971,306 A * | 10/1999 | Ganser, IV | ............. | B02C 2/045 241/207 |
| 6,123,341 A * | 9/2000 | Oki | .................... | B23B 31/16254 279/127 |
| 6,446,892 B1 * | 9/2002 | Fasoli | ...................... | B02C 2/04 241/207 |
| 6,536,694 B2 * | 3/2003 | Van Mullem | ............. | B02C 2/06 241/210 |
| 7,048,214 B2 * | 5/2006 | Johnson | .................... | B02C 2/00 241/207 |
| 7,229,040 B2 * | 6/2007 | Juhlin | .................... | B02C 2/005 241/207 |
| 8,033,491 B2 * | 10/2011 | Solomon | .................. | B02C 2/04 241/209 |
| 8,070,084 B2 * | 12/2011 | Biggin | ...................... | B02C 2/06 241/209 |
| 8,387,905 B2 * | 3/2013 | Solomon | ................ | B02C 2/005 241/207 |
| 9,238,228 B2 * | 1/2016 | Anttila | .................. | B02C 21/026 |
| 2002/0088884 A1 | 7/2002 | Zortman et al. | | |
| 2002/0088887 A1 | 7/2002 | Davis et al. | | |
| 2002/0170994 A1 * | 11/2002 | Van Mullem | ........... | B02C 2/005 241/207 |
| 2003/0011146 A1 * | 1/2003 | Wu | ........................ | B23B 31/34 279/5 |
| 2008/0290200 A1 | 11/2008 | Eriksson et al. | | |
| 2014/0224909 A1 * | 8/2014 | Ha | ............................ | B02C 2/04 241/209 |
| 2016/0250644 A1 * | 9/2016 | Andersson | ................ | B02C 2/06 241/209 |
| 2017/0304830 A1 * | 10/2017 | Polinski | .................... | B02C 2/06 |
| 2017/0304832 A1 * | 10/2017 | Hallberg | ................... | B02C 2/06 |

FOREIGN PATENT DOCUMENTS

| | | |
|---|---|---|
| CN | 1515800 A | 7/2004 |
| CN | 101641158 A | 2/2010 |
| CN | 202238146 U | 5/2012 |
| DE | 1290034 B | 2/1969 |
| EP | 1593863 A1 | 11/2005 |
| FR | 2698131 A1 | 5/1994 |
| GB | 159950 A | 3/1921 |
| GB | 915359 A | 1/1963 |
| GB | 2467747 A | 8/2010 |
| JP | 2005013876 A | 1/2005 |
| WO | 2007/087719 A1 | 8/2007 |
| WO | 2011/082153 A1 | 7/2011 |

OTHER PUBLICATIONS

English Translation of Abstract of CN 1515800 A.
English Translation of Abstract of JP 2005013876 A.
English Translation of Abstract of CN 202238146 U.
German Language International Search Report for International patent application No. PCT/EP2013/072084; dated Oct. 22, 2014.
English translation of International Search Report for International patent application No. PCT/EP2013/072084; dated Oct. 22, 2014.

* cited by examiner

GYRATORY CRUSHER FOR COMMINUTING MATERIAL TO BE CRUSHED

CROSS REFERENCE TO RELATED APPLICATIONS

This application is a U.S. National Stage Entry of International Patent Application Serial Number PCT/EP2013/072084, filed Oct. 22, 2013, which claims priority to German patent application no. DE 102012110267.8 filed Oct. 26, 2012, the entire contents of both of which are incorporated herein by reference.

FIELD

The present invention relates to a gyratory crusher for comminuting material to be crushed, having a crusher housing in which a crusher shaft forming a crusher cone is arranged and which is received in the crusher housing such that it can tumble about a vertical axis, wherein a cross member is provided to receive the crusher shaft, which cross member extends diametrically across the crusher housing and is connected by its cross-member ends to the crusher housing.

BACKGROUND

DE 1 290 034 shows a gyratory crusher for comminuting material to be crushed, having a crusher housing in which a crusher shaft is arranged and which is received in the crusher housing such that it can tumble about a vertical axis. The crusher housing has a round, slightly funnel-shaped form and a cross member in which a rolling bush is provided for mounting the crusher shaft is arranged on the upper edge of the crusher housing. The crusher shaft is mounted in an eccentric bush on the lower side and a thrust bearing is provided on the lower side for the axial support of the crusher shaft in the vertical. The cross member is screwed onto the upper edge of the crusher housing and threaded bolts are shown, by means of which the cross member is connected to the crusher housing.

During the operation of a gyratory crusher, very high dynamic process forces occur between the crusher shaft and the crusher housing, so that a connection between the cross member and the crusher housing by a simple screw connection using threaded bolts is not sufficient. Particularly when the cross member extends in a longitudinal direction between two cross-member ends and when the cross member is connected via the cross-member ends to the upper edge of the crusher housing, force ratios occur between the cross member and the crusher housing which can no longer be absorbed by the threaded bolts.

FIG. 1 shows a gyratory crusher 1 for comminuting material to be crushed according to the state of the art and a cross member 13 is connected to the crusher housing 10 by means of threaded bolts 21. The cross member 13 extends in a longitudinal direction X diametrically across the crusher housing 10 and exhibits two opposite cross-member ends 14 at the ends which are received in receiving pockets 17 that are integrally formed on the top of the crusher housing 10. A rolling bush 22 in which the crusher shaft 11 is mounted and can perform a tumbling movement about the vertical axis 12 is received in the cross member 13.

The high process forces between the crusher shaft 11 and the crusher housing 10 require a connection with a high mechanical load capacity between the cross member 13 and the crusher housing 10. In order to further strengthen the connection between the cross member 13 and the crusher housing 10 by threaded bolts 21, the cross-member ends 14 are cast in the receiving pockets 17 on the crusher housing 10 using a hardening epoxy substance 23. In this way, the connection between the crusher housing 10 and the cross member 13 acquires sufficient mechanical load capacity; however disadvantages occur with the removal of the cross member 13 from the crusher housing 10, which is necessary during maintenance work on the gyratory crusher 1, for example. In order to remove the cross member 13 from the crusher housing 10, the connection formed by the epoxy substance 23 between the cross-member ends 14 and the receiving pockets 17 has to be removed in a costly manner and when the cross member 13 is reconnected to the crusher housing 10, the connection made using the epoxy substance 23 also has to be made again in addition to the connection made by the threaded bolts 21. It is therefore desirable for an easily established connection between the cross member and the crusher housing to be created, which connection is configured in such a manner that the high mechanical forces between the cross member and the crusher housing can be transmitted.

SUMMARY

The problem addressed by the present invention is that of creating a gyratory crusher for comminuting material to be crushed, having a crusher housing and a cross member for receiving a crusher shaft, which gyratory crusher exhibits a connection between the cross member and the crusher housing which has a high mechanical load capacity and at the same time is easily detachable.

This problem is solved by a gyratory crusher of the present disclosure that is configured to comminute material to be crushed, and a method of connecting a cross member to a crusher housing as disclosed herein.

The invention includes the technical teaching that the connection between the cross-member ends and the crusher housing exhibits at least one hydraulic clamping device.

BRIEF DESCRIPTION OF THE DRAWINGS

The present disclosure is described in detail below with reference to the attached drawing figures, wherein.

DETAILED DESCRIPTION

Figure 1:
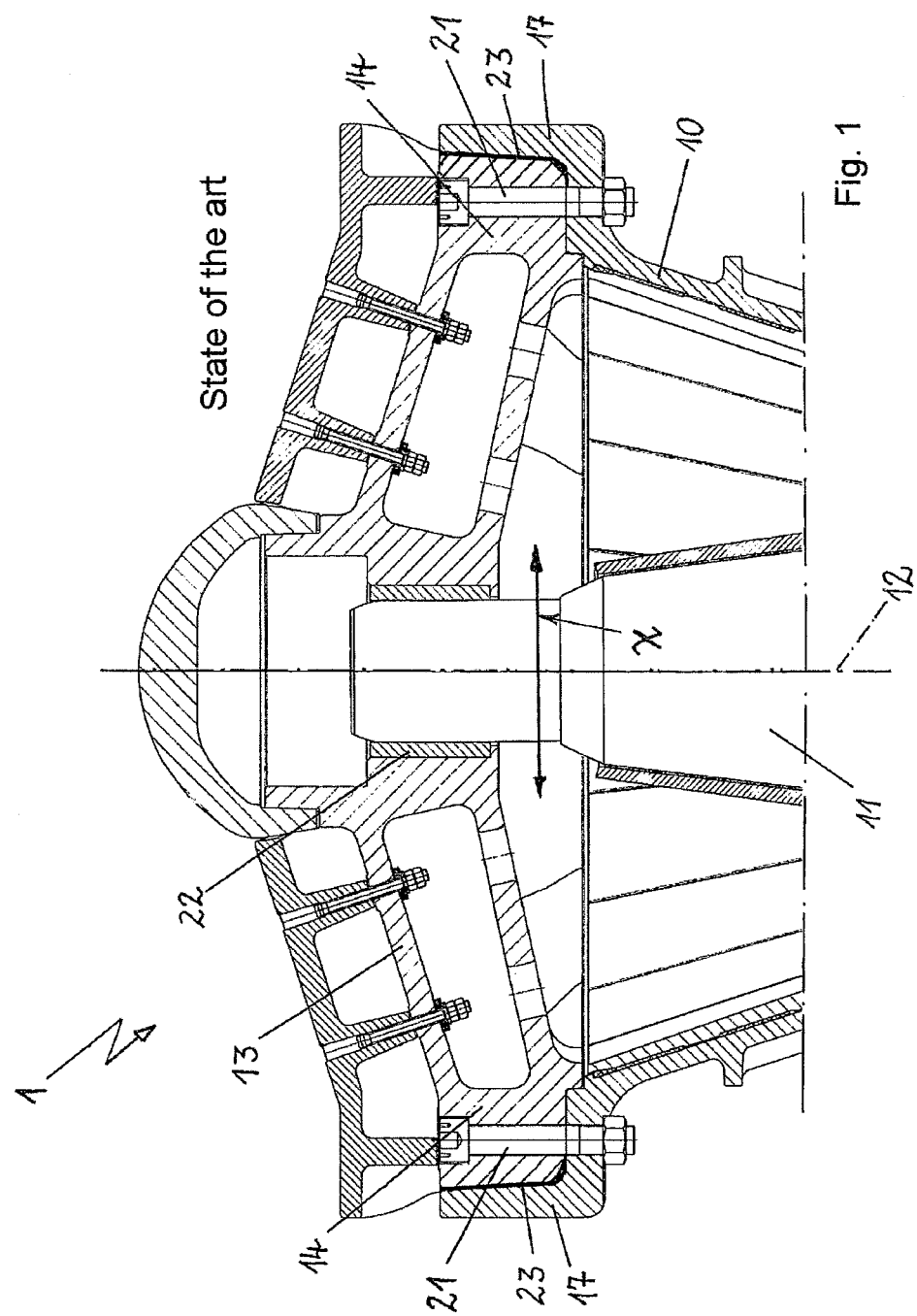
FIG. 1 is a side cross section view of an embodiment of a gyratory crusher of the present disclosure, having a cross member disposed on the crusher housing.

The invention starts from the basic idea of using the high clamping forces that can be achieved with a hydraulic clamping device to connect the cross member to the crusher housing. By means of the hydraulic clamping device, the cross-member ends can be braced and, in particular, clamped to the crusher housing, wherein the connection between the cross member and the crusher housing based on the hydraulic clamping device does not preclude the use of further connecting means, for example threaded bolts. As in the case of the epoxy substance known from the prior art for casting the cross-member ends in the receiving pockets of the crusher housing, the hydraulic clamping device according to the invention can be used as an additional means for connecting the cross member to the crusher housing.

The hydraulic clamping device can be configured such that the cross member is clamped to the crusher housing. Likewise, it may be provided that the hydraulic clamping device is configured such that the cross member is fastened to the crusher housing in a positively locking manner by means of the hydraulic clamping device.

According to an advantageous embodiment, the hydraulic clamping device may comprise at least one hydraulically acting clamping element. The hydraulically acting clamping element may correspond to the design of a lifting cylinder and, in particular, to that of a lifting plunger, wherein the clamping element can be configured in such a way that it is able to provide very high compressive forces over short traveling distances. The hydraulically acting clamping elements may be operated using a pressure fluid which is created by a hydraulic oil, for example.

According to an advantageous embodiment of the crusher housing of the gyratory crusher, said crusher housing may exhibit receiving pockets for receiving the cross-member ends and the hydraulic clamping device may be arranged for clamping the cross-member ends in the receiving pockets. The clamping elements of the clamping device may, for example, be arranged in the receiving pockets, in order to clamp the cross member via its cross-member ends in the receiving pockets. For example, the cross member may extend via its cross-member ends in a longitudinal direction, wherein at least one hydraulically acting clamping element is provided which clamps the cross member in its longitudinal direction between the two receiving pockets. Furthermore, hydraulically acting clamping elements may be provided which clamp the cross-member ends in a transverse direction running transversely to the longitudinal direction in the respective receiving pockets. Consequently, a first clamping element or a first pair of clamping elements can be provided which can apply a force in the longitudinal direction of the cross member. In this case, it may be sufficient for the clamping element or the pair of clamping elements, for example, to be arranged in one of the receiving pockets, in order to apply the longitudinal force to the cross member. Clamping elements which clamp the cross-member ends in the receiving pockets in a transverse direction may be arranged in each of the receiving pockets.

Further advantageously, counter-pressure elements can be provided which are each arranged opposite the configuration of the hydraulically acting clamping elements in the receiving pockets. The counter-pressure elements may, for example, be inserted in the receiving pocket in an exchangeable manner and, so that the cross member can be adjusted at least once on the crusher housing, the precise position of the cross member on the crusher housing can be determined through the corresponding use or exchange of one or a plurality of counter-pressure elements, when the hydraulically acting clamping elements are put under pressure. In particular, the counter-pressure elements may comprise bearing plates with which an effective height of the counter-pressure elements can be set, so that the cross member can be aligned on the crusher housing via the height dimension of the counter-pressure elements.

According to an advantageous development of the gyratory crusher according to the invention, a pressurizing medium supply device can be provided, wherein the hydraulically acting clamping elements can be connected via pressurizing medium lines to the pressurizing medium supply device. In particular, the pressurizing medium supply device may be designed to maintain a minimum clamping force through the hydraulically acting clamping elements to clamp the cross member. For this purpose, pressure monitoring of the pressurizing medium may be provided, for example, to which the hydraulically acting clamping elements are exposed. If the monitored hydraulic pressure falls below a threshold value, a hydraulic pump can be put into operation, for example, in order to raise the hydraulic pressure back to a minimum value again. In this way, the required high mechanical load-bearing connection between the cross member and the crusher housing can be ensured during operation of the gyratory crusher.

Threaded bolts such as those already known from the prior art can be used as the basic connection for arranging the cross member on the crusher housing. Consequently, the hydraulic clamping device according to the invention is particularly used as an additional mechanical connection with which the cross member is arranged on the crusher housing and, in addition, the cross-member ends can be screwed in the receiving pockets. For example, each of the cross-member ends can be screwed in the receiving pockets using two threaded bolts which preferably extend parallel to the vertical axis of the gyratory crusher.

The result is that a connection can be created of the cross member on the crusher housing of a gyratory crusher, which connection has a high load-bearing capacity without the use of an epoxy substance, so that it can absorb the mechanical forces between the crusher shaft and the crusher housing. The advantage is, in particular, that through a simple release of pressure from the hydraulic system, the hydraulic clamping device can be released, as a result of which only the threaded bolts between the cross member and the crusher housing then have to be removed, in order finally to remove the cross member from the crusher housing. If the cross member has been removed from the crusher housing during maintenance work or for other reasons, it can easily be arranged on the crusher housing again by reactivating the hydraulic clamping device and by reinserting the threaded bolts between the cross member and the crusher housing.

The present invention also relates to a method of connecting a cross member to a crusher housing of a gyratory crusher which is used for comminuting material to be crushed. A crusher shaft is arranged in the crusher housing of the gyratory crusher, which crusher shaft is received in the crusher housing such that it can tumble about a vertical axis and wherein the cross member is provided to receive the crusher shaft and extends for this purpose roughly diametrically across the crusher housing and is connected by its cross-member ends to the crusher housing. The method in this case envisages that the cross member is clamped by its cross-member ends to connect to the crusher housing by means of at least one hydraulic clamping device.

In addition, the method for connecting the cross member by its cross-member ends to the crusher housing may comprise the screw connection step involving threaded bolts. In order to avoid having a negative effect on the connection action in each case involved in connecting the cross member to the crusher housing by the hydraulic clamping device, on the one hand, and by the threaded bolts, on the other, the method of connecting the cross member to the crusher housing may have a cascading design.

A preferred method of connecting the cross member to the crusher housing envisages that a hydraulic pre-positioning of the cross-member ends in the receiving pockets on the crusher housing initially takes place by activating the hydraulic clamping device while applying a pre-clamping pressure. In this case, the pre-clamping pressure exhibits a value that may be smaller than the final operating clamping pressure.

The selected pre-clamping pressure may, for example, be so small that the cross member can be adequately positioned at the counter-pressure elements but the pre-clamping pressure can also reach the operating clamping pressure. The cylinders are then depressurized and the threaded bolts are inserted and can finally be tightened by applying the operating screw pretension. The clamping pressure of the hydraulic clamping device can then be brought to an operating clamping pressure.

In order to ensure a permanent connection between the cross member and the crusher housing using the hydraulic clamping device, the operating clamping pressure of the hydraulic clamping device can be monitored and maintained by a pressurizing medium supply device. For example, monitoring of the operating clamping pressure can at least take place when the gyratory crusher is in operation. In order to remove the cross member from the crusher housing, the hydraulic operating clamping pressure can initially be removed from the system, for example, so that the hydraulic clamping device is deactivated. The threaded bolts can then be removed between the cross member and the crusher housing, so that the cross member can then be freely removed from the crusher housing.

The method involved in the first-time connection of the cross member to the crusher housing may comprise a referencing step, in order to set up the counter-pressure elements arranged on the crusher housing accordingly. For example, a reference edge may exist on the crusher housing, against which a reference stop can be brought to bear at the cross member. The thickness of the counter-pressure elements can then be determined in such a manner that starting from the stop of the cross member towards the reference edge on the crusher housing, the cross member is arranged in a positionally accurate manner on the crusher housing following application of the hydraulic pressure on the clamping device. In particular, the precise position of the cross-member ends in the assigned receiving pockets can be set via the thickness of the counter-pressure elements.

Various embodiments and aspects of the present disclosure are discussed in further detail below, with reference to the attached drawing figures.

FIG. 1 shows a gyratory crusher 1 according to the state of the art and has already been described in the introduction.

Figure 2:
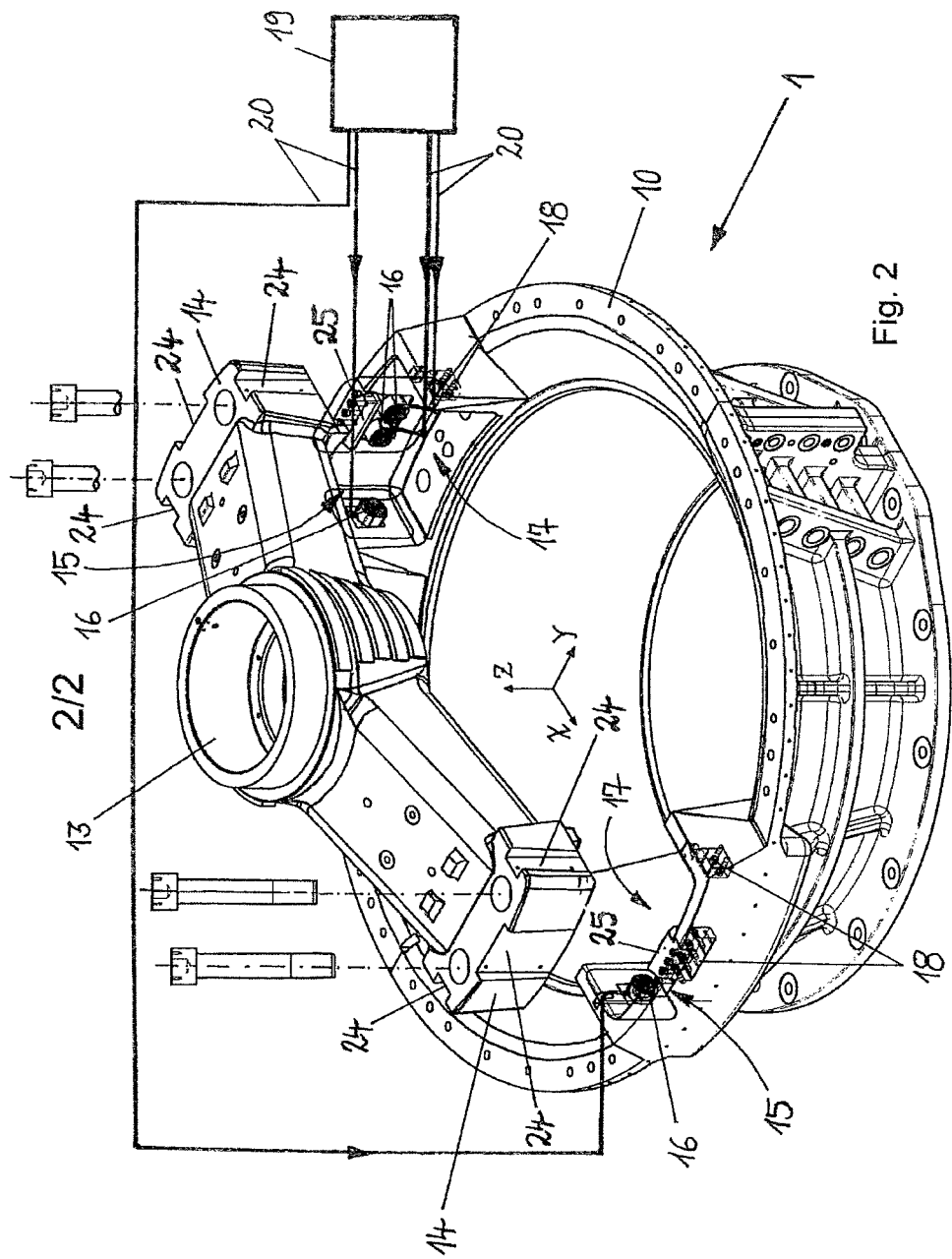
FIG. 2 is an isometric view of an embodiment of a gyratory crusher of the present disclosure, having a cross member disposed on a crucher housing.

FIG. 2 shows components of a gyratory crusher 1 according to FIG. 1, wherein only the upper part of the crusher housing 10 and the cross member 13 arranged on the crusher housing 10 are shown. The cross member 13 extends along a longitudinal direction X and can be arranged in a roughly diametric configuration across the crusher housing 10 thereon. In order to receive the cross member 13 on the crusher housing 10, the cross member 13 exhibits cross-member ends 14 at its opposite end sides, wherein opposite receiving pockets 17 are configured on the crusher housing 10, in which pockets the cross-member ends 14 can sit. In order to arrange the cross member 13 on the crusher housing 10, it is positioned in a negative Z direction which reproduces the vertical direction of the gyratory crusher 1 on the crusher housing 10, wherein the vertical direction Z of the vertical axis 12 according to the state of the art corresponds to FIG. 1.

According to the invention, hydraulically acting clamping devices 15 are located in each of the receiving pockets 17. The hydraulically acting clamping devices 15 each comprise hydraulically acting clamping elements 16 which are set up to clamp the cross-member ends 14 in the receiving pockets 17 in such a manner as to produce a connection between the cross member 13 and the crusher housing 10 that is releasable but has a high mechanical load capacity.

Three clamping elements 16 are arranged in the rear receiving pocket 17 and one clamping element 16 in the front receiving pocket 17. Two clamping elements 16 forming a pair of clamping elements are disposed on an outer wall of the receiving pocket 17, so that these clamping elements 16 apply tension to the cross member 13 in the longitudinal direction X. In each of the receiving pockets 17, further hydraulically acting clamping elements 16 are located on a side wall, in order to clamp the respective cross-member ends 14 in a transverse direction Y in the receiving pockets 17. Pressing faces 24 which each run spaced apart from one another in a plane-parallel fashion are configured at the cross-member ends 14, so that the clamping pressure between the clamping elements 16 and the counter-pressure elements 18 can be absorbed via the pressing faces 24. The clamping elements 16 configured as hydraulic cylinders are protected by cross-member guides 25 which are introduced into the receiving pockets 17 and guarantee a secure installation of the cross member 13.

Furthermore, a pressurizing medium supply device 19 which is connected to the respective clamping elements 16 via pressurizing medium lines 20 is shown schematically. The pressurizing medium supply device 19 supplies the clamping elements 16 with pressurizing medium which may be in the form of hydraulic oil, for example. It is provided in this case that at least during operation of the gyratory crusher 1, the pressurizing medium supply device 19 permanently exposes the clamping elements 16 to a minimum hydraulic pressure, in order to permanently safeguard the connection with a high mechanical load capacity between the cross member 13 and the crusher housing 10. For this purpose, the pressurizing medium supply device 19 may comprise a pressure monitor, in order to monitor the minimum pressure of the hydraulic system of the hydraulic clamping device 15.

The clamping of the cross member 13 on the crusher housing 10 of the gyratory crusher 1 according to the invention results in a particularly easy-to-maintain assembly and disassembly of the cross member 13, as a result of which an enormous economic advantage is achieved. Following a one-off adjustment of the thicknesses of the counter-pressurizing elements 18, additional clamping can take place via the hydraulically acting clamping elements 16 immediately after the cross member 13 has been inserted. The monitoring and use of the pressurizing medium supply device 19 may, for example, be an integral part of a gyratory crusher control system which is known by the trade name GYRAMATIC. Using this control system, the pressure which is applied to the clamping elements 16 by the pressurizing means supply device 19 can be monitored. In particular, the casting of the cross-member ends 14 of the cross member 13 in the receiving pockets 17 of the crusher housing 10 using epoxy resin is dispensed with, meaning that the hardening time of approx. 24 hours associated with this is also dispensed with and no epoxy resin residues have to be removed from the receiving pockets 17 during the dismantling of the cross member 13.

The invention is not limited in its embodiment to the preferred exemplary embodiment indicated above. Instead, a number of variants is conceivable which makes use of the solution presented, even with embodiments of an essentially different nature. All features and/or advantages emerging from the claims, the description or the drawings, including structural details or spatial arrangements may be essential to the invention, both in themselves and also in a wide variety of combinations.

LIST OF REFERENCE NUMBERS

1 Gyratory crusher
10 Crusher housing
11 Crusher shaft
12 Vertical axis
13 Cross member
14 Cross-member end
15 Hydraulic clamping device
16 Hydraulically acting clamping element
17 Receiving pocket
18 Counter-pressure element
19 Pressurizing medium supply device
20 Pressurizing medium line
21 Threaded bolt
22 Rolling bush
23 Epoxy substance
24 Pressing face
25 Cross-member guide
X Longitudinal direction
Y Transverse direction
Z Vertical direction

The invention claimed is:

1. A gyratory crusher for comminuting material to be crushed, comprising:
    a crusher housing that includes a first receiving pocket defined therein;
    a crusher shaft disposed within said crusher housing and configured to tumble about a vertical axis;
    a cross member having cross-member ends, wherein the first receiving pocket of the crusher housing is configured to receive a first of the cross-member ends such that said cross member extends diametrically across said crusher housing, said cross member being configured to receive therein said crusher shaft; and
    a first hydraulic clamping device that includes a first hydraulically acting clamping element disposed in the first cross-member end or said crusher housing, and configured to clamp the first cross-member end to said crusher housing by engagement of the first hydraulically acting clamping element in the first receiving pocket.

2. The gyratory crusher of claim 1, wherein said crusher housing includes a second receiving pocket defined therein that is configured to receive a second of said cross-member ends, and wherein a second hydraulic clamping device that includes a second hydraulically acting clamping element is disposed in the second receiving pocket.

3. The gyratory crusher of claim 2, wherein said cross member extends in a longitudinal direction between the first and second cross-member ends, and wherein said first hydraulically acting clamping element is configured to couple said cross member longitudinally to said crusher housing in the longitudinal direction of said cross member between said receiving pockets of said crusher housing.

4. The gyratory crusher of claim 2 wherein the cross member extends in a longitudinal direction between the first and second cross-member ends, wherein each said hydraulically acting clamping element is configured to clamp one of said cross-member ends in a transverse direction that runs transverse to said longitudinal direction in each said receiving pocket.

5. The gyratory crusher of claim 2, further comprising one or more counter-pressure elements disposed in said receiving pockets of said crusher housing opposite each said hydraulically acting clamping element.

6. The gyratory crusher of claim 2, further comprising a pressurizing oil supply device operatively coupled to said first hydraulically acting clamping element by a pressurizing oil line, said pressurizing oil supply device configured to maintain a minimum clamping force from said first hydraulically acting clamping element on said cross member.

7. The gyratory crusher of claim 2, further comprising one or more threaded bolts fastened between said cross-member ends and said receiving pockets of said crusher housing and configured to couple said cross member to said crusher housing.

8. A method of coupling a cross member to a crusher housing of a gyratory crusher for comminuting material to be crushed, comprising:
    providing the gyratory crusher of claim 2;
    operatively engaging the cross-member ends with the crusher housing;
    clamping the cross-member ends respectively to the receiving pockets by engagement of the first and second hydraulic clamping devices in the respective receiving pockets.

9. The method of claim 8, further comprising:
    screwing the cross-member ends to the crusher housing by threaded fasteners.

10. The method of claim 8, wherein said engaging step comprises:
    positioning the cross-member ends in the receiving pockets of the crusher housing.

11. The method of claim 10, wherein said clamping step comprises:
    hydraulically pre-positioning the cross-member ends in the receiving pockets of the crusher housing by activating the hydraulic clamping devices to apply a pre-clamping pressure;
    subsequently depressurizing hydraulic cylinders of the hydraulic clamping devices;
    fastening the cross-member ends to the crusher housing by threaded bolts;
    tightening the threaded bolts to an operating screw pretension; and
    reapplying clamping pressure from the hydraulic clamping devices.

12. The method of claim 10, further comprising:
    monitoring and maintaining an operating clamping pressure of the hydraulic clamping devices by a pressure oil supply device.

* * * * *